Aug. 2, 1932.  A. BRIECHLE  1,870,091
FILM POSITIONING DEVICE FOR AERIAL CAMERAS
Filed Jan. 11, 1932  4 Sheets-Sheet 1
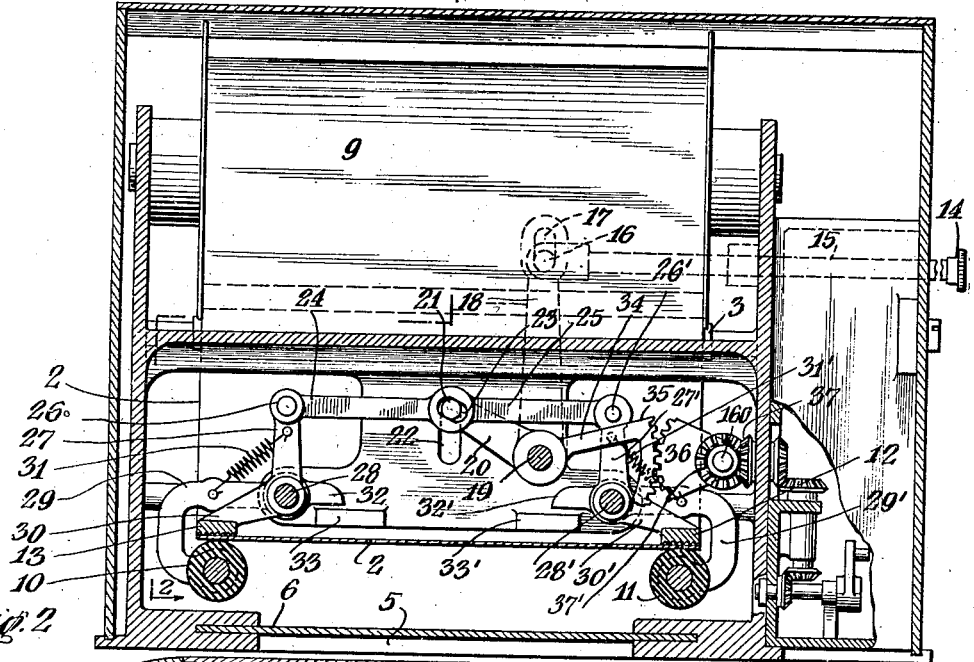
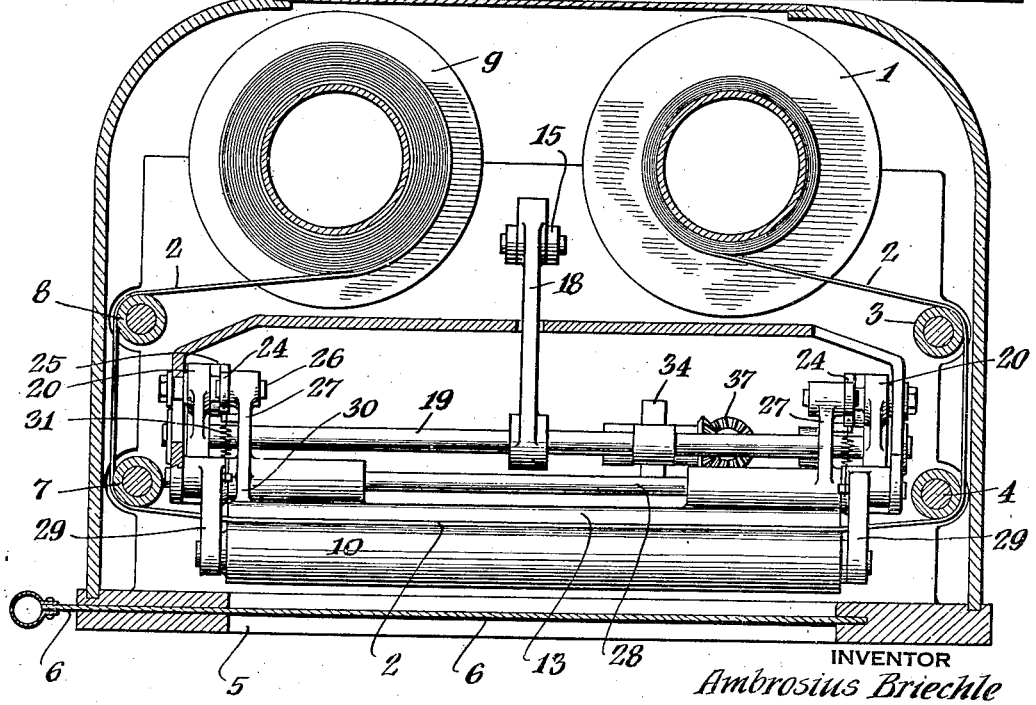
INVENTOR
*Ambrosius Briechle*
BY
*Hoguet & Meary*
ATTORNEYS Aug. 2, 1932.   A. BRIECHLE   1,870,091
FILM POSITIONING DEVICE FOR AERIAL CAMERAS
Filed Jan. 11, 1932   4 Sheets-Sheet 2
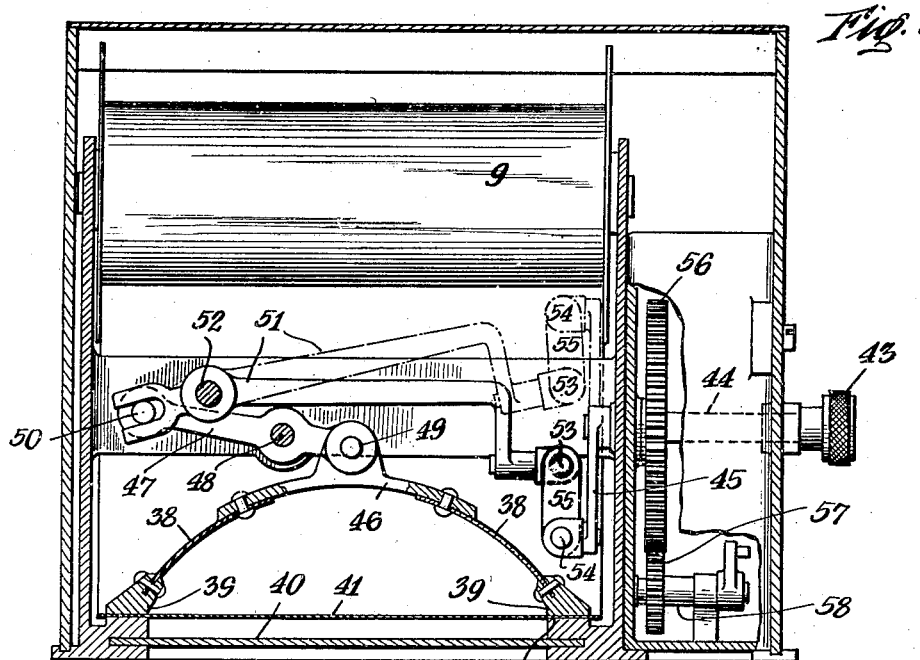
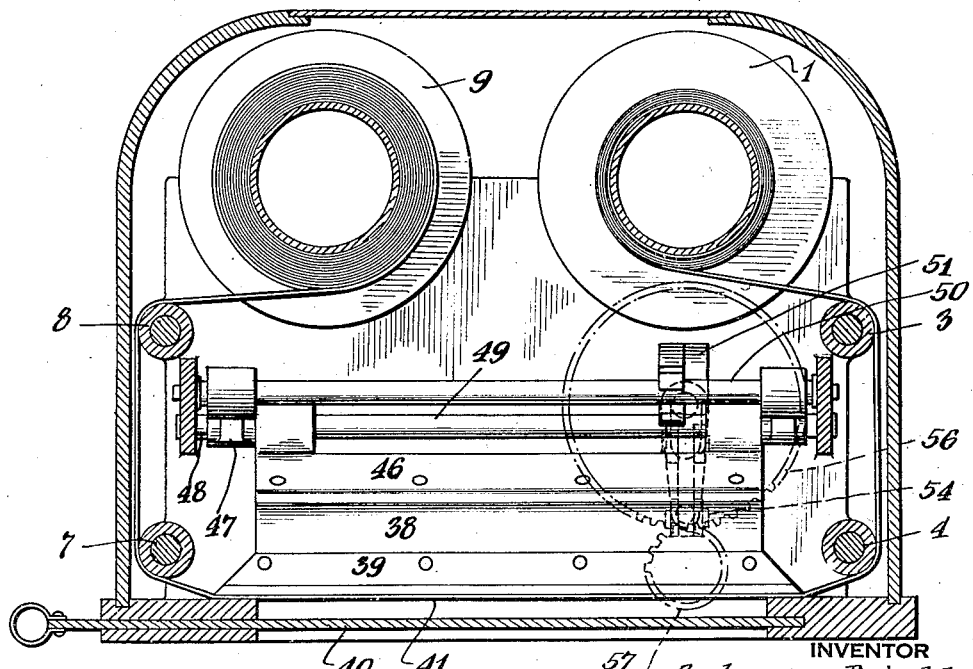
INVENTOR
Ambrosius Briechle
BY
Hoguet & Neary
ATTORNEYS

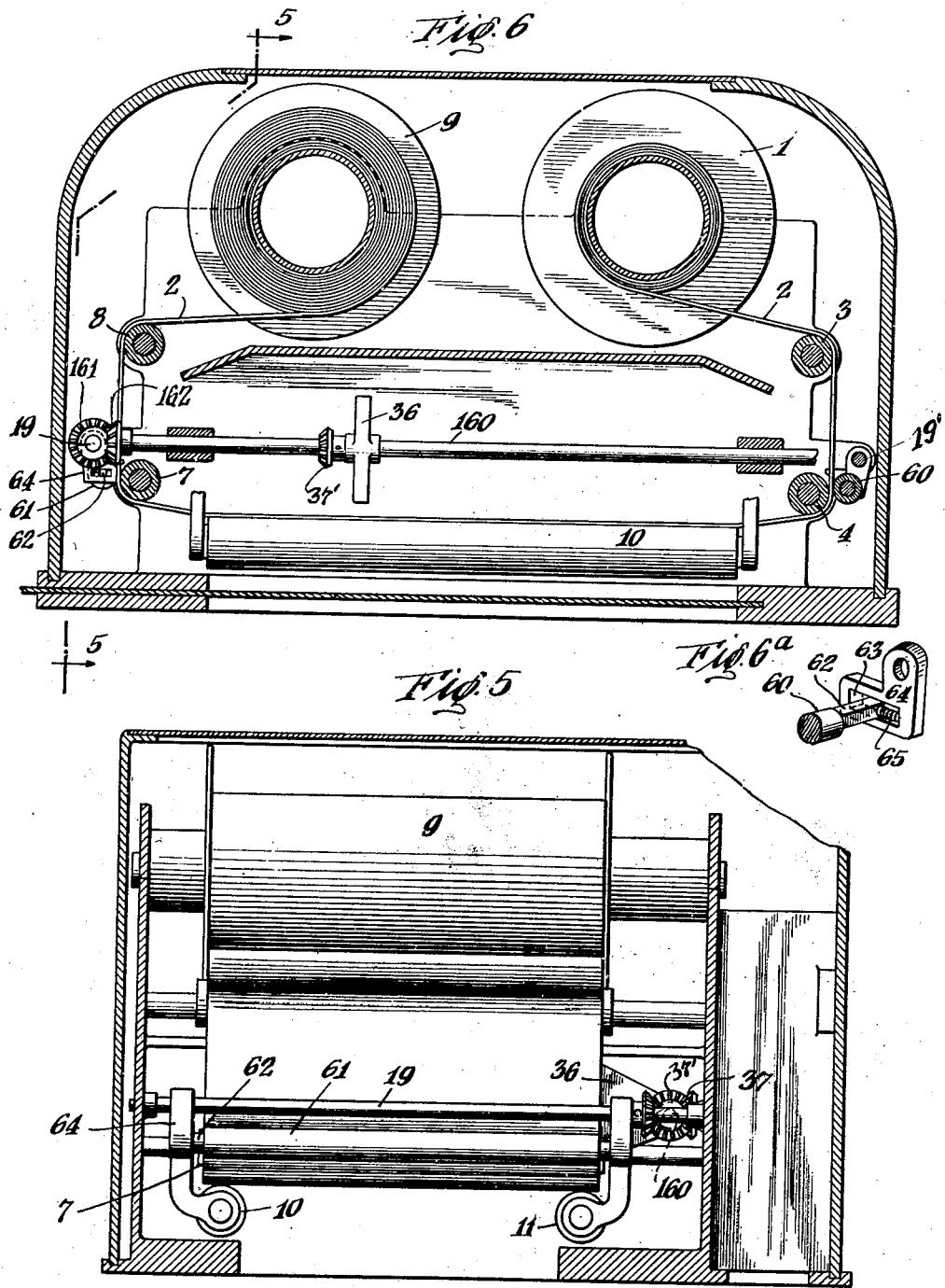

Aug. 2, 1932.  A. BRIECHLE  1,870,091
FILM POSITIONING DEVICE FOR AERIAL CAMERAS
Filed Jan. 11, 1932  4 Sheets-Sheet 4

INVENTOR
*Ambrosius Briechle*
BY
*Hoguet & Neary*
ATTORNEYS

Patented Aug. 2, 1932

1,870,091

UNITED STATES PATENT OFFICE

AMBROSIUS BRIECHLE, OF NEW YORK, N. Y., ASSIGNOR TO FAIRCHILD AERIAL CAMERA CORPORATION, OF NEW YORK, N. Y., A CORPORATION OF NEW YORK

FILM POSITIONING DEVICE FOR AERIAL CAMERAS

Application filed January 11, 1932. Serial No. 585,819.

This invention relates in general to camera mechanism and more particularly to film positioning devices for aerial cameras.

An object of the invention is to provide a camera with positively actuated mechanism for positioning and maintaining the photographic film at the focal plane and entirely flat and parallel to and over the exposure opening during exposure.

Another object is to provide such a positioning device that will be in positive synchronism with the film feeding and shutter tripping mechanism, and which may be perfectly adaptable for use whether the camera be fully automatic, hand operated or both.

A further object is to provide such a device that will be mechanically operated to the exclusion of suction or pressure devices or transparent positioning plates between the shutter which would have a tendency towards distorting the image.

A still further object is to provide such a device that holds the film flat and also under uniform tension throughout the length and width of the area over the exposure area while that portion of the film is being exposed.

With the foregoing and other objects in view, the invention consists in the combination of parts and in the details of construction hereinafter set forth in the following description and appended claims, certain embodiments thereof being illustrated in the accompanying drawings, in which:

Figure 1 is a view in section taken through the magazine of an aerial camera showing the film positioning device.

Figure 2 is a view in section taken through the same magazine at right angles to that shown in Figure 1.

Figure 3 is a view similar to Figure 1 showing a modified form of film positioning device.

Figure 4 is a view in section taken at right angles to that shown in Figure 3.

Figure 5 is a view similar to Figure 1 showing a modification thereof by which the film is placed under tension in all four directions by two pairs of opposed gripping elements.

Figure 6 is a view similar to Figure 2 showing the construction of the modified form of Figure 5.

Figure 7:
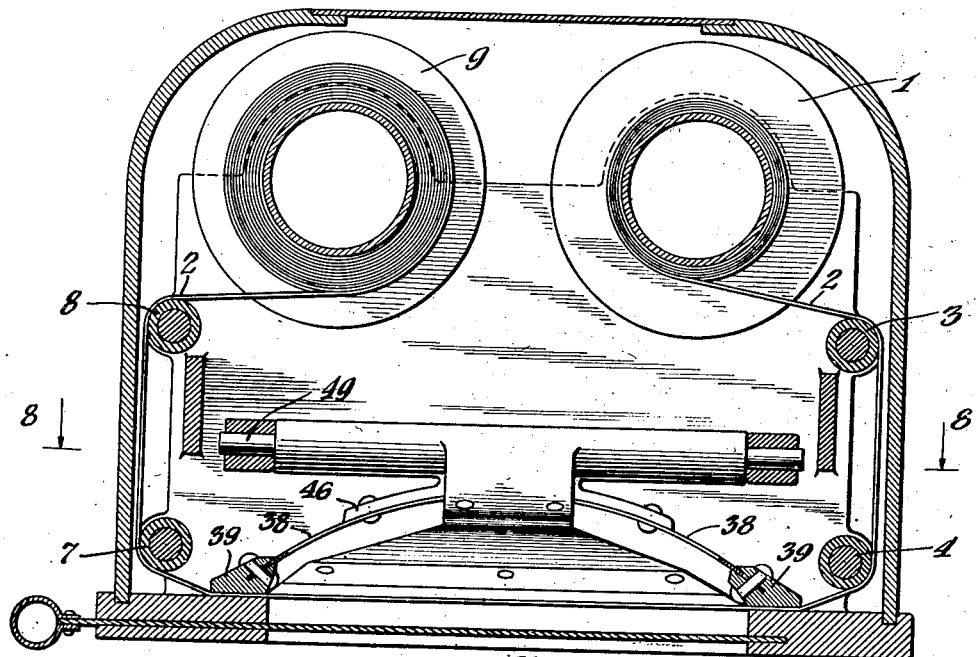
Figure 7 is a view similar to Figure 4 showing a modification thereof by which the film is placed under tension in all four directions by two pairs of gripping elements.

Referring more particularly to the drawings, which generally represent the magazine of the well-known "Fairchild" aerial camera magazine of the type patented in United States patent to Fairchild, No. 1,804,680, May 12, 1931, the present invention deals with the problem of dispensing with the transparent positioning plate and spring operated pressure plate shown respectively at 155 and 157 in Figure 11 of that patent. It has been found that the positioning plate causes certain light refractions tending to distort the image and further that the contact of the pressure plate and the positioning plate with the film tends to scratch the film and does not insure against the film being uneven or that it will be flat and under uniform tension during exposure.

In Figure 2 there is shown a spool 1 from which the film 2 is drawn, the film passing over idler rolls 3 and 4, thence over the exposure opening 5 of the camera, which in this instance is shown covered by a dark slide 6. The film then passes over idler rolls 7 and 8 and wound on the storage spool 9.

The feature with which this invention is primarily concerned is the proper positioning and maintenance of the film over the exposure area during photographic exposure and to insure that the film is of uniform size, and is flat and parallel to the plane of exposure. In order to accomplish this, there are provided rollers 10 and 11, which extend in a plane parallel but at right angles to that of the film spools 1 and 9. These rollers, in combination with gripping blocks 12 and 13, are the actual elements which contact with the film only at predetermined intervals and through any suitable mechanism may be operated to stretch the film so that it will be taut, flat and parallel to the exposure plane 5.

The operating mechanism for causing the engagement of the film by the roller and gripping block and the film straightening and positioning operations brought about after such engagement, may be under manual or automatic control. While the latter type of control is preferred, for sake of clarity and simplicity, a manual control will be described. Figure 1 shows the film in the proper position under tension of the gripping and stretching effect of the members 11 and 12 pulling in the opposite direction outwardly from that in which the members 10 and 13 are pulling. Obviously if a photograph is desired, the dark slide 6 would be removed.

The forces tending to keep the film engaging devices in the position shown in Figure 1 are the result of the position of and the relation of the inter-engaging levers. Under the assumption that a manual control may be used, the push button 14 is shown pushed in causing its shaft 15 by reason of its pin 16 engaging the slot 17 of a lever 18 to effect a counterclockwise rotation of the latter about a shaft 19 as its stationary pivot. Integral with lever 18 is a lever 20 which carries a pin 21 which is slidable in an elongated slot 22 in the camera frame. This pin also rides in an elongated slot 23 which is formed in the pivotal joining ends of levers 24 and 25 in such a manner as to limit and control the pivoting action of these levers. In this figure representing the above mentioned period of camera operation, these levers are in extended position and the pin 21 has reached the top of the slot 22. The lever 24 has through its pivotal connection 26 to the lever 27 rotated the latter counterclockwise about its stationary pivot 28. The gripping block 13 is carried by an arm 30 mounted on the pivot 28 so as to rotate in unison with the arm 27. The curved arm 29 carrying the roller 10 may either be stationarily mounted or mounted to pivot about 28, such pivot to be limited by the abutment of the stop 32 against the block 33. A spring 31 between the arms 29 and 27 tends to bring the gripping block 13 into engagement with the film.

The operation of the gripping block 12 and roller 11 is simultaneous with that of block 13 and roller 10 and is brought about through identical means employed in connection with the latter, the reference characters being marked prime accordingly and respectively.

As before stated, the positioning and straightening of the film is to take place immediately before the photographic exposure. The tripping of the shutter may be brought about by any suitable means but it is important that such means should operate in synchronism with the film positioning device. Merely for purposes of illustration, there is shown in Figure 1 an arm 34 integral with arm 20 and carrying a rack 34 to engage with a rack 36, the rotation of which rotates a gear 37, the operation of which may, by any suitable means, cause the tripping of the shutter. This shutter tripping takes place practically simultaneous with the completion of the film positioning and straightening operations. Whether such operations are brought about manually or automatically, the film is relieved of the engagement of the tensioning devices immediately after the completion of the photographic exposure, in order for the film winding operations to take place.

It may be found desirable to have film gripping blocks 39 carried by resilient elements, such as spring steel leaves 38, as shown in Figure 3. In this embodiment the film 41 passes over the exposure area 40 and contacts with shoulders 42 of the camera frame. A turn of the control knob 43 rotates the shaft 44 and through means of intermediate levers causes a downward pressure on and a spreading of the spring leaves, the gripping blocks engaging and positioning and stretching the film to a limited degree just prior to the exposure of the film. Figure 3 shows in full lines the relative position of the actuating means when the film is being stretched. The spring leaves are carried by a curved plate 46 which is pivotally connected at 49 to a lever 47 pivoted to a fixed pivot 48. Lever 47 carries a pin 50 which forms the means of a sliding connection between lever 47 and lever 51, which latter rotates about a fixed pivot 52. Lever 51 is of angular construction and is indirectly connected to the arm 45 by means of two universal joints 53 and 54 and a connecting link 55. In order to release the pressure on the leaf springs 38 which exists when the apparatus is in the position shown in full lines in Figure 3, the knob 43 may be manually rotated so as to cause the rotation of shaft 44 which moves arm 45 and arm 51 to the position shown in dotted lines. Arm 51 in rotating about its pivot 52 causes a downward pressure on pin 50, causing the lever 47 in its counter clockwise movement about pivot 48 to lift up the gripping blocks away from contact with the film.

As explained in connection with the embodiment shown in Figure 1, the operation of the film positioning device should be in proper synchronism with the shutter tripping and film winding and for that purpose a gear 56 may be carried by shaft 44 to rotate therewith and to mesh with gear 57, the rotation of which may operate a shaft 58 leading to any suitable shutter tripping device. While in the device as shown in Figures 1, 2, 3 and 4 the film during the exposure period is gripped near its lateral edges and placed under lateral tension, the film feeding mechanism comprises the only means of placing the film under longitudinal tension. In the preferred form of the invention, however, gripping devices are provided for engaging the film so as to place it under tension longitudinally and laterally.

Figure 8:
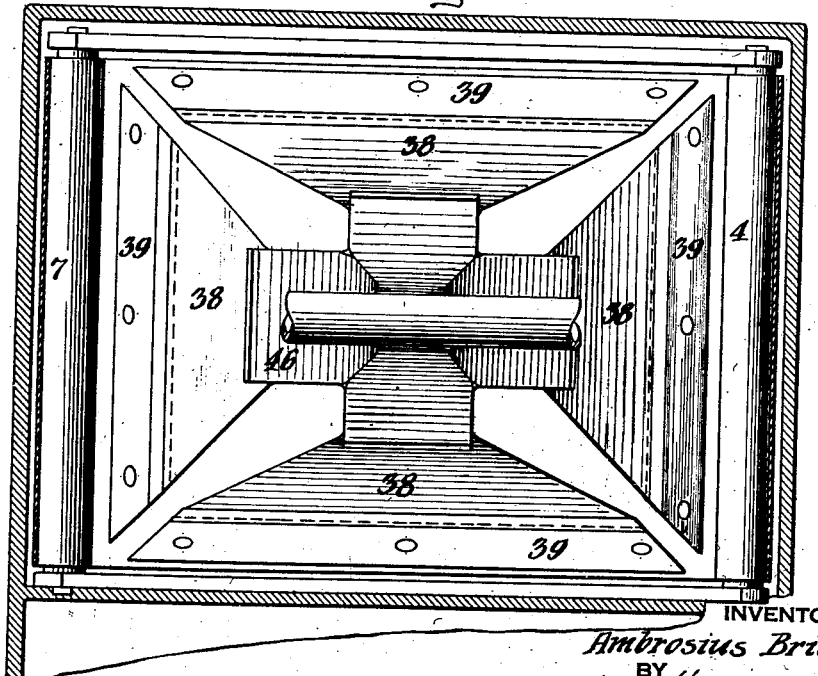
Figure 8 is a view in section taken along line 8—8 of Figure 7.

As shown in Figures 7 and 8 the plate 46, spring 38 and gripping elements 39 are duplicated so as to be operated by mechanism similar to that shown in Figures 3 and 4. In this case, as well as in Figures 3 and 4, the gripping elements 39 are so arranged as to be without the confines of the exposure opening. While the operation of the film positioning and tensioning or straightening devices is under the control of the film feeding mechanism, the tension set up in the film in all four directions is in no other way dependent upon the film feeding mechanism.

Figures 5 and 6 carry out the general arrangement of Figures 1 and 2, with the exception that there are provided additional gripping rollers 60 and 61 to grip the film respectively against rollers 4 and 7, the rollers 60 and 61 being rotated in opposite directions so as to place the film under longitudinal tension. The rotation of these rollers 60 and 61 is brought about simultaneously with the operation of the gripping elements 12 and 13 shown in Figure 1 which cooperate with rollers 11 and 10 respectively to put the film under lateral tension. Each of the rollers 60 and 61 may be mounted on a shaft 62 slidably arranged in a recess 63 on a pivoted lever 64 and provided with a spring 65 which provides for a contact of the roller with the film so that the operation of the mechanism for actuating the roller is against the action of the spring. This is accomplished automatically by the rotation of the shaft 160 through the meshing of the sectors 35 and 36, causing a rotation of shaft 160 and through the meshing of such gears as 161 and 162 rotate shaft 19 and through like gears cause the rotation of shaft 19' which carry rollers 60 and 61. The bevel gear 37 operated by the train of gears shown in Figure 1 meshes with gear 37' to cause shaft 160 to rotate. The manual operation is brought about by the same means shown in Figure 1, the manual rotation of shaft 19 causing the operation of rollers 60 and 61 simultaneously with the operation of the gripping blocks and rollers 11, 12 and 13, 10.

In the event that an automatic aerial camera is employed, the operation of the film positioning device may be automatically brought about and controlled by the automatic operations of the film winding and shutter setting and tripping devices. Such a construction is described in the United States patent to Sherman M. Fairchild, Number 1,804,680, May 12, 1931 (Figure 3), which is standard with the Fairchild Aerial Camera Corporation, for the synchronism of film winding devices with those for operating a film positioning and pressure plate. It is sufficient to say that either of the present modifications shown in Figures 1 and 3, or others of other similar form and purpose may be so related to the construction shown in Figure 1 of the patent that the film positioning and stretching devices shall properly operate by the rotation of shaft 160 and consequently the shaft 19 for operating the gripping devices exerting a tension in all four directions within the plane of disposition of the film.

I claim:

1. In a film camera, means for positioning and maintaining said film flat and parallel to the exposure plane immediately prior to and during the complete photographic exposure, said means including winding and unwinding film spools and devices adapted to releasably engage said film so as to place the latter under tension in all directions within a plane parallel to the exposure plane.

2. In a film camera, means for positioning and maintaining said film flat and parallel to the exposure plane immediately prior to and during the complete photographic exposure, said means including winding and unwinding film spools and also devices which latter are adapted to releasably grip said film and place said film under tension in all directions within a plane parallel to the exposure plane.

3. In a film camera having film advancing and shutter operating devices, means for positioning and maintaining said film flat and parallel to the exposure plane immediately prior to and during the complete photographic exposure, said means including winding and unwinding film spools and also gripping devices which latter are adapted to releasably engage said film and place said film under tension in all directions solely within a plane parallel to the exposure plane, means for operating said gripping devices, said operating means being connected to said film winding and shutter operating devices by operating elements and being controlled thereby so as to preclude deviation from a predetermined sequence of operation of said camera.

4. In a film camera, means for positioning and maintaining said film flat and parallel to the exposure plane, said means comprising film winding and unwinding spools for advancing the film and also mechanical means for releasably gripping said film and placing the same under tension in all directions within a plane parallel to the exposure plane.

5. In a film camera, means for positioning and maintaining said film flat and parallel to the exposure plane, said means comprising film winding and unwinding spools for advancing the film and also mechanical means for releasably gripping said film and placing the same under tension, said last named means comprising a pair of opposed gripping elements and rollers adapted to be cojointly operated to be forced in opposite directions by a single control medium.

6. In an aerial film camera, means for positioning and maintaining said film flat and parallel to the exposure plane immediately prior to and during the complete photographic exposure, said means including film winding and unwinding spools for advancing the film and also mechanical means for gripping said film and placing the same under tension, connecting elements between said positioning means and said film winding means so that the operation of said positioning means is under the control of said film winding means.

7. In an aerial film camera, means for positioning and maintaining said film flat and parallel to the exposure plane immediately prior to and during the complete photographic exposure, said means including film winding and unwinding spools for advancing the film and also mechanical means for gripping said film and placing the same under tension in all directions within a plane parallel to the exposure plane, connecting elements between said positioning means and said film winding means so that the operation of said positioning means is under the control of said film winding means, said positioning means comprising opposed gripping elements and rollers adapted to be cojointly operated by a single control medium so as to be forced in opposite directions.

In testimony whereof, I have signed my name to this specification this 30th day of December, 1931.

AMBROSIUS BRIECHLE.